United States Patent
Jepsen et al.

(10) Patent No.: US 9,803,833 B2
(45) Date of Patent: Oct. 31, 2017

(54) MULTI-APERTURE ILLUMINATION LAYER FOR TILEABLE DISPLAY

(71) Applicant: X Development LLC, Mountain View, CA (US)

(72) Inventors: Mary Lou Jepsen, Sausalito, CA (US); Belle Fu, Taipei (TW); Andrei Stefan Kazmierski, San Jose, CA (US)

(73) Assignee: X Development LLC, Mountain View, CA (US)

( * ) Notice: Subject to any disclaimer, the term of this patent is extended or adjusted under 35 U.S.C. 154(b) by 139 days.

(21) Appl. No.: 14/095,793

(22) Filed: Dec. 3, 2013

(65) Prior Publication Data

US 2015/0153023 A1    Jun. 4, 2015

(51) Int. Cl.
*F21V 13/00* (2006.01)
*F21V 13/02* (2006.01)
(Continued)

(52) U.S. Cl.
CPC ............... *F21V 13/02* (2013.01); *F21V 5/04* (2013.01); *F21V 5/045* (2013.01); *G02B 6/0036* (2013.01);
(Continued)

(58) Field of Classification Search
CPC . F21V 13/00–13/14; F21V 5/04; F21V 5/045; G02F 1/1335; G02F 1/133504;
(Continued)

(56) References Cited

U.S. PATENT DOCUMENTS 5,353,133 A   10/1994   Bernkopf
5,428,468 A    6/1995   Zimmerman et al.
(Continued)

FOREIGN PATENT DOCUMENTS

CN      1144913 A    3/1997
CN    202065796 U   12/2011
(Continued)

OTHER PUBLICATIONS

PCT/US2014/058692, PCT International Search Report and Written Opinion, dated Jan. 8, 2015 (9 pages).
(Continued)

*Primary Examiner* — Sean Gramling
*Assistant Examiner* — Gerald J Sufleta, III
(74) *Attorney, Agent, or Firm* — Christensen O'Connor Johnson Kindness PLLC

(57) ABSTRACT

A tileable display panel includes a screen layer, an illumination layer and a display layer. The screen layer is for displaying a unified image to a viewer. The illumination layer includes at least one light source emitting lamp light into a diffusing region of the illumination layer. The illumination layer also includes a plurality of emission apertures that are each configured to emit the lamp light from the diffusing region in a divergent projection beam. The display layer is disposed between the screen layer and the illumination layer. The display layer includes a plurality of pixelets corresponding to the plurality of emission apertures. The pixelets in the plurality of pixelets are positioned to be illuminated by the divergent projection beams from the corresponding emission apertures.

20 Claims, 6 Drawing Sheets

(51) Int. Cl.
*F21V 5/04* (2006.01)
*F21V 8/00* (2006.01)
*G03B 37/04* (2006.01)
*G02F 1/1333* (2006.01)
*G02F 1/1335* (2006.01)
*G03B 21/10* (2006.01)
*G03B 21/13* (2006.01)
*G03B 21/56* (2006.01)

(52) U.S. Cl.
CPC .......... *G02B 6/0096* (2013.01); *G03B 37/04* (2013.01); *G02F 1/13336* (2013.01); *G02F 1/133615* (2013.01); *G03B 21/10* (2013.01); *G03B 21/13* (2013.01); *G03B 21/56* (2013.01)

(58) Field of Classification Search
CPC . G02F 1/133524; G02B 6/0096; G02B 27/14; G02B 6/0036
See application file for complete search history.

(56) References Cited

U.S. PATENT DOCUMENTS

| | | | |
|---|---|---|---|
| 5,661,531 A | 8/1997 | Greene et al. | |
| 5,816,677 A * | 10/1998 | Kurematsu | F21V 5/02 362/23.13 |
| 6,611,241 B1 | 8/2003 | Firester et al. | |
| 6,680,761 B1 | 1/2004 | Greene et al. | |
| 6,942,959 B2 | 9/2005 | Dubin et al. | |
| 7,145,611 B2 | 12/2006 | Dubin et al. | |
| 7,339,625 B2 | 3/2008 | Matthys et al. | |
| 7,495,638 B2 | 2/2009 | Lamvik et al. | |
| 7,744,289 B2 | 6/2010 | Hu | |
| 9,123,266 B2 | 9/2015 | Bastani et al. | |
| 2002/0080302 A1 | 6/2002 | Dubin et al. | |
| 2003/0117545 A1 | 6/2003 | Coker et al. | |
| 2006/0012733 A1 | 1/2006 | Jin et al. | |
| 2007/0103652 A1 | 5/2007 | Nijim et al. | |
| 2009/0322985 A1 * | 12/2009 | Mizuuchi | G02B 6/0006 349/62 |
| 2010/0177261 A1 | 7/2010 | Jin et al. | |
| 2010/0232165 A1 * | 9/2010 | Sato | G02F 1/133611 362/296.01 |
| 2010/0265160 A1 | 10/2010 | Hajjar | |
| 2012/0236217 A1 | 9/2012 | Kitai | |
| 2013/0077345 A1 * | 3/2013 | Sato | G02B 6/0061 362/609 |
| 2013/0093646 A1 | 4/2013 | Curtis et al. | |
| 2013/0135589 A1 * | 5/2013 | Curtis | G02B 27/26 353/8 |
| 2013/0279177 A1 * | 10/2013 | Moriwaki | G02F 1/13336 362/330 |
| 2014/0071255 A1 * | 3/2014 | Okuyama | G03B 35/18 348/55 |
| 2014/0168032 A1 * | 6/2014 | Swan | G06F 3/1446 345/1.3 |
| 2015/0022727 A1 | 1/2015 | Jepsen | |
| 2015/0022754 A1 | 1/2015 | Jepsen et al. | |
| 2015/0023051 A1 | 1/2015 | Jepsen et al. | |
| 2015/0036379 A1 * | 2/2015 | Lee | G02F 1/133617 362/606 |
| 2015/0043242 A1 * | 2/2015 | Ding | G03B 21/2033 362/583 |
| 2015/0097837 A1 | 4/2015 | Jepsen et al. | |
| 2015/0097853 A1 | 4/2015 | Bastani et al. | |
| 2015/0176773 A1 * | 6/2015 | Yamamoto | F21V 3/0472 362/97.3 |

FOREIGN PATENT DOCUMENTS

| | | |
|---|---|---|
| CN | 102339565 A | 2/2012 |
| CN | 102723048 A | 10/2012 |
| JP | 2003-169271 A | 6/2003 |
| JP | 2007-519330 A | 7/2007 |
| KR | 10-2010-0075758 | 7/2012 |
| TW | 201215967 A | 4/2012 |
| WO | WO 2013/158248 A1 | 10/2013 |

OTHER PUBLICATIONS

TW 103136355—First Office Action with English Translation, dated Feb. 17, 2016, 13 pages.
Korean Application No. 10-2016-7017635—Notice of Preliminary Rejection dated Jul. 28, 2017, 12 pages.

* cited by examiner

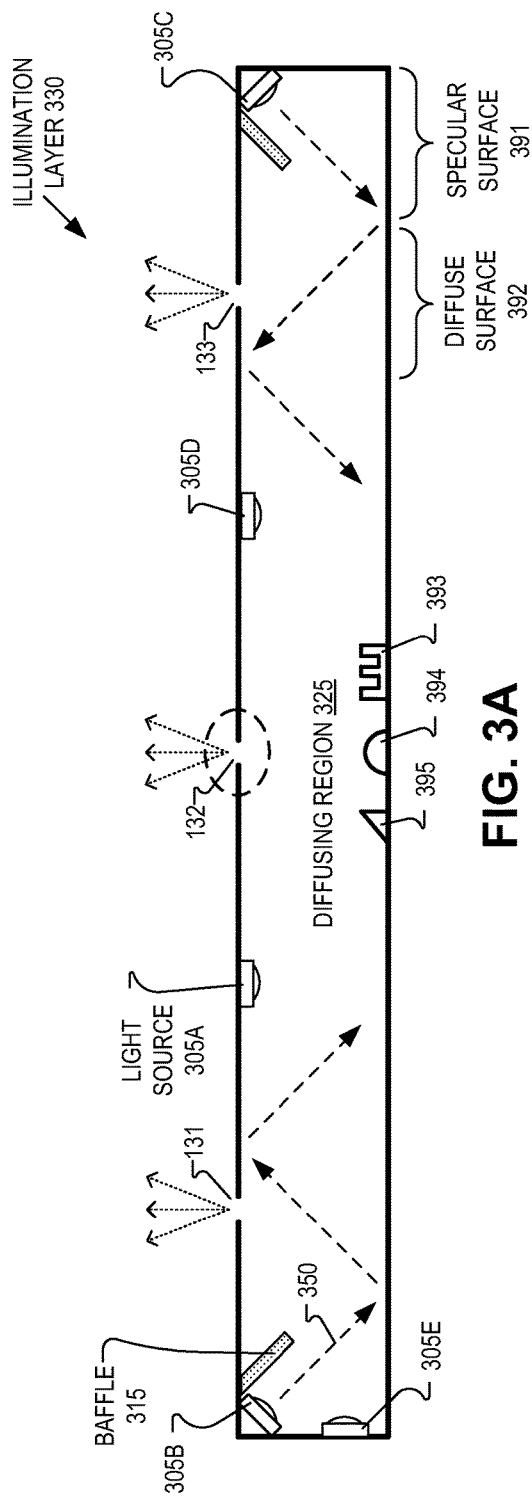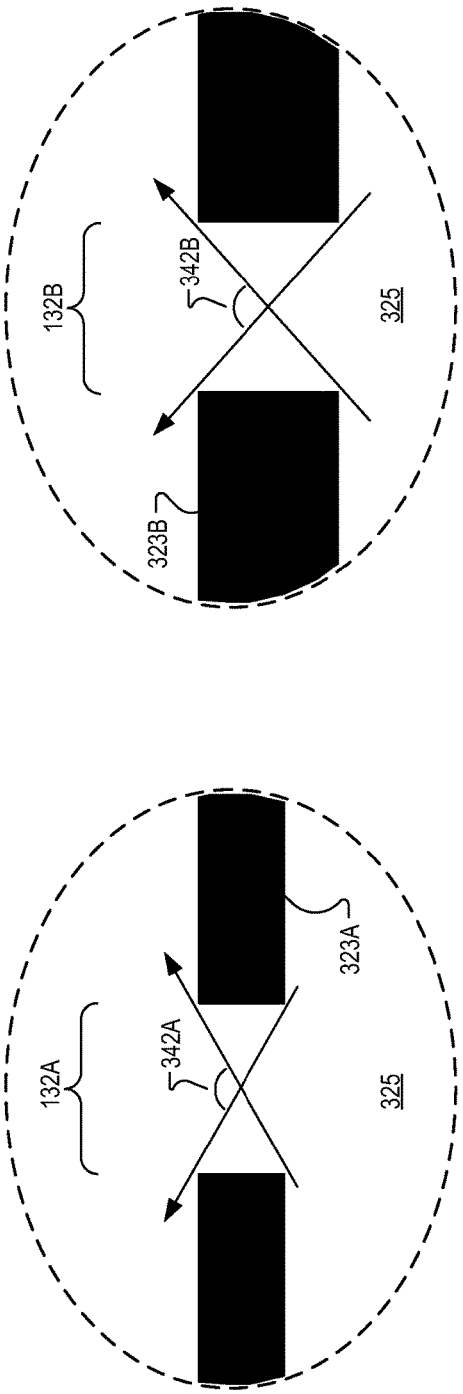

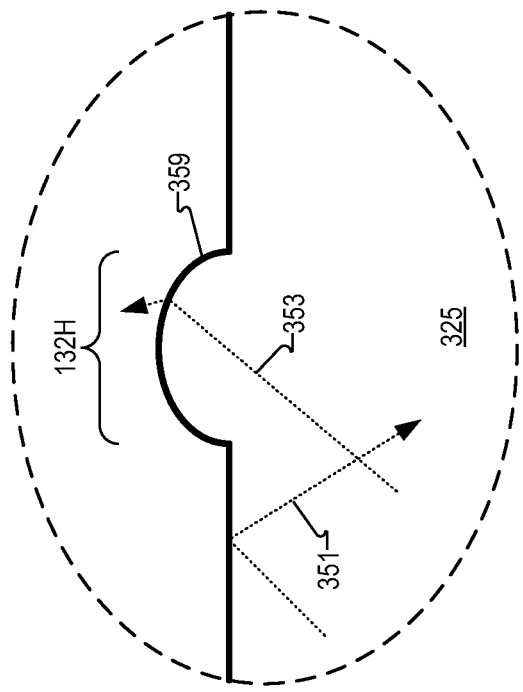
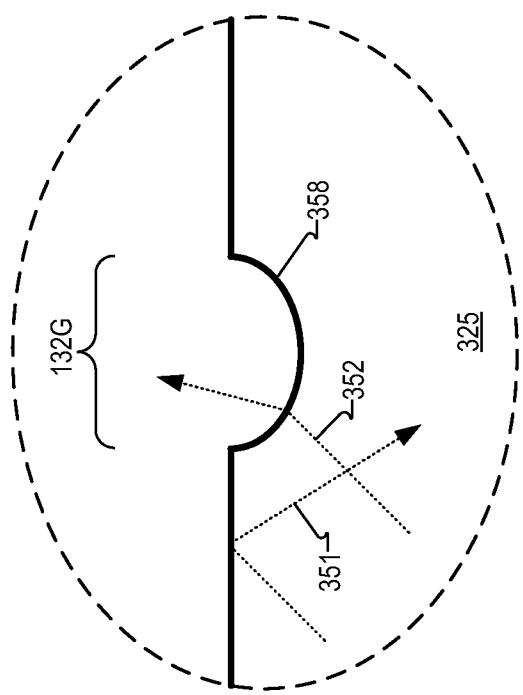

MULTI-APERTURE ILLUMINATION LAYER FOR TILEABLE DISPLAY

TECHNICAL FIELD

This disclosure relates generally to optics, and in particular but not exclusively, relates to tileable display panels.

BACKGROUND INFORMATION

Large displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

Tiling multiple smaller, less expensive display panels together can achieve a large multi-panel display, which may be used as a large wall display. The individual images displayed by each display panel may constitute a sub-portion of the larger overall-image collectively displayed by the multi-panel display. While a multi-panel display can reduce costs, visually it has a major drawback. Specifically, bezel regions that surround the displays put seams or cracks in the overall-image displayed by the multi-panel display. These seams are distracting to viewers and detract from the overall visual experience.

Tileable displays that could be configured as a multi-panel display that reduced or eliminated distracting seams between the tileable display panels are desirable. These tileable displays may require new configurations of displaying images that include new illumination designs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3A shows a cross-section illustration of an example illumination layer for a display apparatus, in accordance with an embodiment of the disclosure.

FIGS. 3B-3I illustrate example designs for apertures of an illumination layer, in accordance with an embodiment of the disclosure.

DETAILED DESCRIPTION

Embodiments of a display system and tileable displays are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
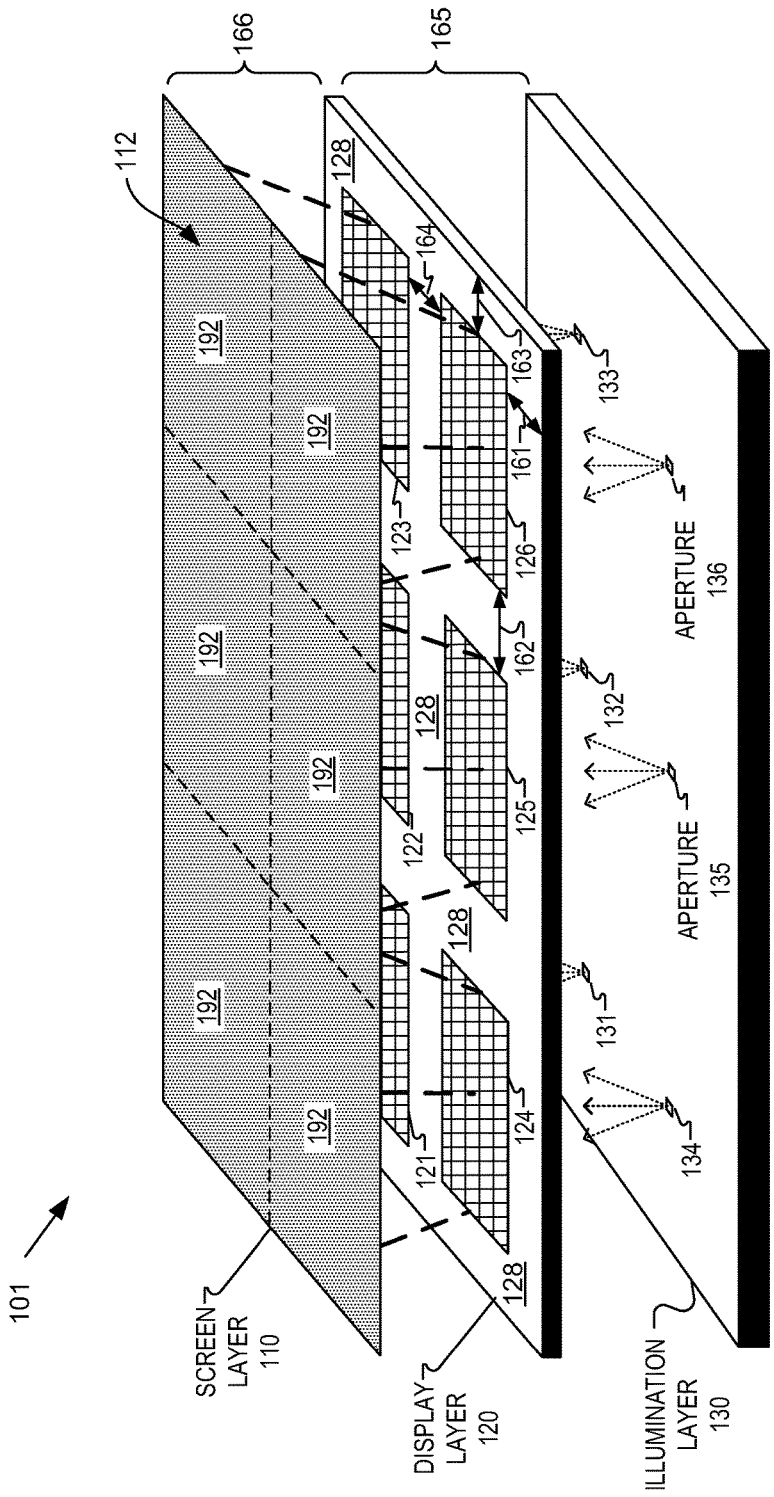
FIG. 1A illustrates a display apparatus that includes a display layer disposed between a screen layer and an illumination layer, in accordance with an embodiment of the disclosure.

FIG. 1A illustrates a display apparatus 101 that includes a display layer 120 disposed between a screen layer 110 and an illumination layer 130, in accordance with an embodiment of the disclosure. Display apparatus 101 may be tiled with other displays 101 and arranged into a multi-panel display that displays a multi-panel unified image across the displays 101. FIG. 1A shows that illumination layer 130 includes a plurality of emission apertures 131, 132, 133, 134, 135, and 136. In the illustrated embodiment, each emission aperture is disposed on a common plane of illumination layer 130. Each emission aperture 131-136 is configured to emit a divergent projection beam having a limited angular spread that is directed toward a specific corresponding pixelet in display layer 120. In one embodiment, each of the divergent projection beams from emission apertures 131-136 share similar characteristics with regard to flux, intensity, color point, wavelength, and angular divergence such that uniformity is maximized and single source failure is avoided.

Display layer 120 includes a matrix of pixelets 121, 122, 123, 124, 125, and 126. In the illustrated embodiment, each pixelet in the matrix of pixelets is oriented on a common plane of display layer 120. The pixelets may be liquid-crystal-displays ("LCDs") that can be color LCDs or monochromatic LCDs. In the embodiment illustrated in FIG. 1A, each pixelet includes a transmissive pixel array arranged in rows and columns (e.g. 100 pixels by 100 pixels). In one embodiment, each pixelet is an independent display array separated by spacing region 128 on display layer 120. In one embodiment, each pixelet measures 20×20 mm. FIG. 1A shows a 2×3 matrix of pixelets 121-126. The pitch between each pixelet in the matrix may be the same. In other words, the distance between a center of one pixelet and the center of its adjacent pixelets may be the same distance. In the illustrated embodiment, each emission aperture in the plurality of emission apertures has a one-to-one correspondence with a pixelet. For example, emission aperture 131 corresponds to pixelet 121, emission aperture 132 corresponds to pixelet 122, emission aperture 133 corresponds to pixelet 123, and so on. Also in the illustrated embodiment, each emission aperture is centered under its respective corresponding pixelet.

Display layer 120 includes spacing region 128 surrounding pixelets 121-126. In FIG. 1A, pixelet 126 is adjacent to pixelets 123 and 125. Pixelet 126 is spaced by dimension 162 from pixelet 125 and spaced by dimension 164 from pixelet 123. Dimensions 162 and 164 may be considered "internal spacing" and are the same distance, in some embodiments. Pixelet 126 is also spaced by dimensions 161 and 163 from edges of display layer 120. Dimensions 161 and 163 may be considered "external spacing" and are the same distance, in some embodiments. In one embodiment, dimensions 161 and 163 are half of the distance as dimensions 162 and 164. In one example, dimensions 161 and 163 are both 2 mm and dimensions 162 and 164 are both 4 mm. In the illustrated embodiment, the internal spacing between pixelets is substantially greater than the pixel pitch (space between pixels) of pixels included in each pixelet.

Figure 1B:
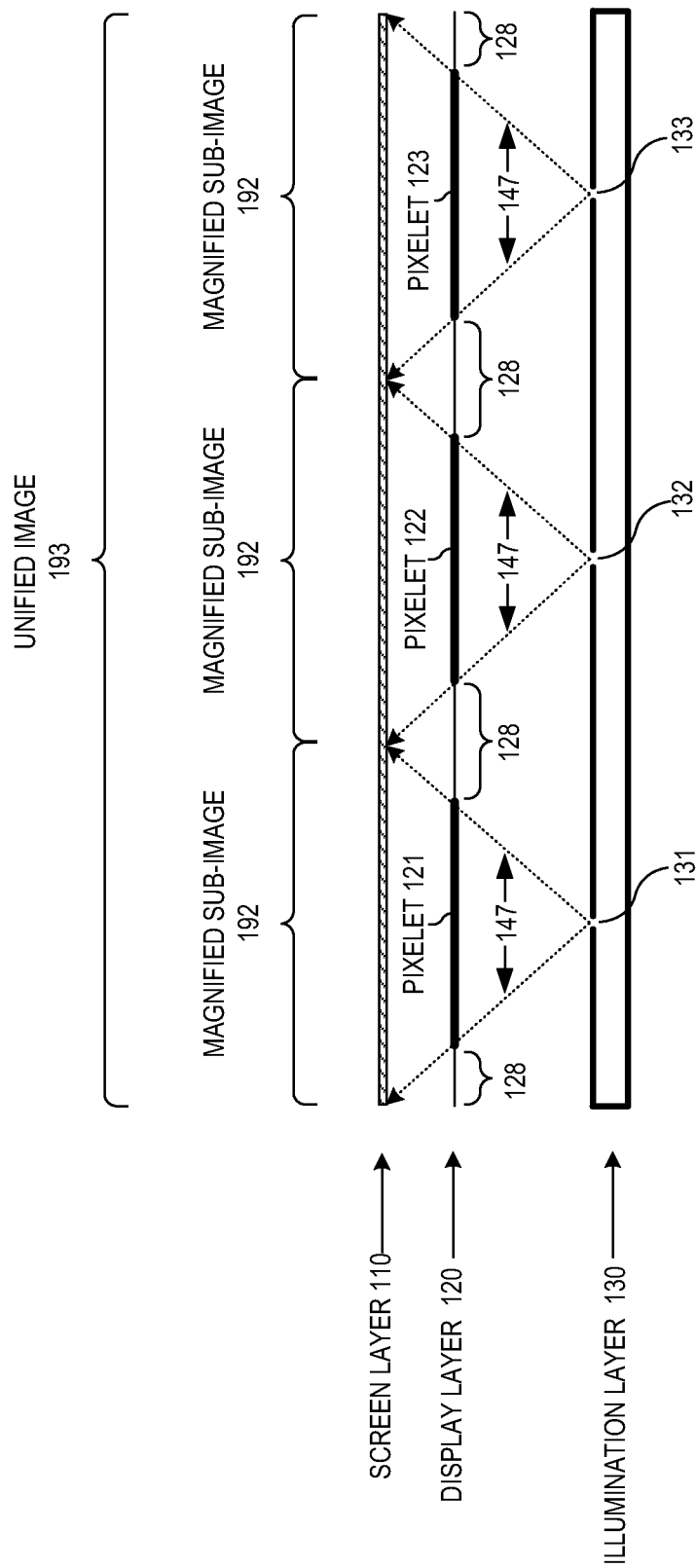
FIG. 1B illustrates an example illumination layer that includes emission apertures configured to emit divergent projection beams having a limited angular spread that are directed toward a specific corresponding pixelet in a display layer, in accordance with an embodiment of the disclosure.

FIG. 1B illustrates an example illumination layer 130 that includes emission apertures 131, 132, and 133 configured to emit divergent projection beams 147 having a limited angular spread that are directed toward a specific corresponding pixelet in display layer 120, in accordance with an embodiment of the disclosure. In operation, display light in each divergent projection beam 147 from the emission apertures (e.g. emission aperture 131) propagates toward its corresponding pixelet (e.g. pixelet 121). Each pixelet drives their pixels to display a sub-image on the pixelet so the display light that propagates through the pixelet includes the sub-image displayed by the pixelet. Since the emission aperture that generates the divergent projection beam 147 is relatively small (approximating a point source) and the divergent projection beam 147 has a limited angular spread, the sub-image in the display light gets larger as it gets further away from the pixelet. Therefore, when the display light (including the sub-image) encounters screen layer 110, a magnified version of the sub-image (magnified sub-image 192) is projected onto a backside of screen layer 110.

Referring back to FIG. 1A, screen layer 110 is offset from pixelets 121-126 by a fixed distance 166 to allow the sub-images to become larger as display light (in the divergent projection beams from the emission apertures) propagates further from the pixelet that drove the sub-image. Therefore, the fixed distance 166 will be one component of how large the magnification of the sub-images is. In one embodiment, fixed distance 166 is 2 mm. Screen layer 110 may be similar to those used in rear-projection systems. In one embodiment, each sub-image generated by pixelets 121-126 is magnified by 1.5×. In some embodiments each sub-image generated by pixelets 121-126 is magnified by 1.05-1.25×. The offset by fixed distance 166 may be achieved by using a transparent intermediary (e.g. glass or plastic layers). In one embodiment, screen layer 110 is fabricated of a matte material suitable for rear projection that is coated onto a transparent substrate that provides the offset by fixed distance 166.

The backside of screen layer 110 is opposite a viewing side 112 of screen layer 110. As FIGS. 1A and 1B show, screen layer 110 may be made of a diffusion screen that presents a unified image 193 (made up of magnified sub-images 192) on the viewing side 112 of screen layer 110 by scattering the display light in the divergent projection beams 147 (that includes the sub-images) from each of the pixelets 121-126.

Consequently display apparatus 101 can generate a unified image 193 using the magnified sub-images 192 generated by emission apertures 131-136 and their corresponding pixelets 121-126. And, since the geometric alignment of the magnified sub-images 192 would leave virtually no gap (if any) between the magnified sub-images 192, unified image 193 will be perceived as seamless by a viewer. As FIGS. 1A and 1B show, the magnified sub-images on the backside of the screen layer 110 combine laterally to form unified image 193 on the frontside 112 of screen layer 110. The magnification of the sub-images driven by the pixelets allows the unified image 193 to reach the edge of screen layer 110, while display layer 120 and illumination layer 130 may still include a mechanical bezel that offers rigidity and support for electrical connections that is out of sight to a viewer of display apparatus 101.

In FIGS. 1A and 1B, the magnified sub-images 192 are each the same size and square-shaped. To generate same sized magnified sub-images 192, display layer 120 and its pixelets 121-126 may be offset from emission apertures 131-136 by a fixed dimension 165 (as shown in FIG. 1A). In one embodiment, dimension 165 is 8 mm. While FIGS. 1A and 1B do not illustrate intervening layers between the layers 110, 120, and 130, it should be appreciated that embodiments may include various intervening optical and structural layers, such as lens arrays, optical offsets, and transparent substrates to provide mechanical rigidity.

In some embodiments (not illustrated in FIG. 1B), divergent projection beams 147 from different emission apertures may overlap upon the spacing region 128 on the backside of display layer 120. In some embodiments, each pixelet is directly illuminated solely by one divergent projection beam from its corresponding emission aperture, which may approximate a point source. In certain embodiments, a very small percentage of light from non-corresponding emission apertures may become indirectly incident upon a pixelet due to unabsorbed reflections of divergent projection beams 147 from the non-corresponding emission apertures. Spacing regions 128 and illumination layer 130 may be coated with light absorption coatings (that are known in the art) to decrease reflections from non-corresponding emission apertures from eventually becoming incident upon a pixelet that does not correspond with the emission aperture. The limited angular spread of the emission aperture may be designed to ensure that divergent projection beams 147 only directly illuminates the pixelet that corresponds to a particular emission aperture. In contrast, conventional LCD technology utilizes lamps (e.g. LEDs or cold-cathode-fluorescents) with a generally Lambertian light distribution and diffusive filters in an attempt to generate uniform and diffuse light for backlighting an LCD panel.

Figure 2:
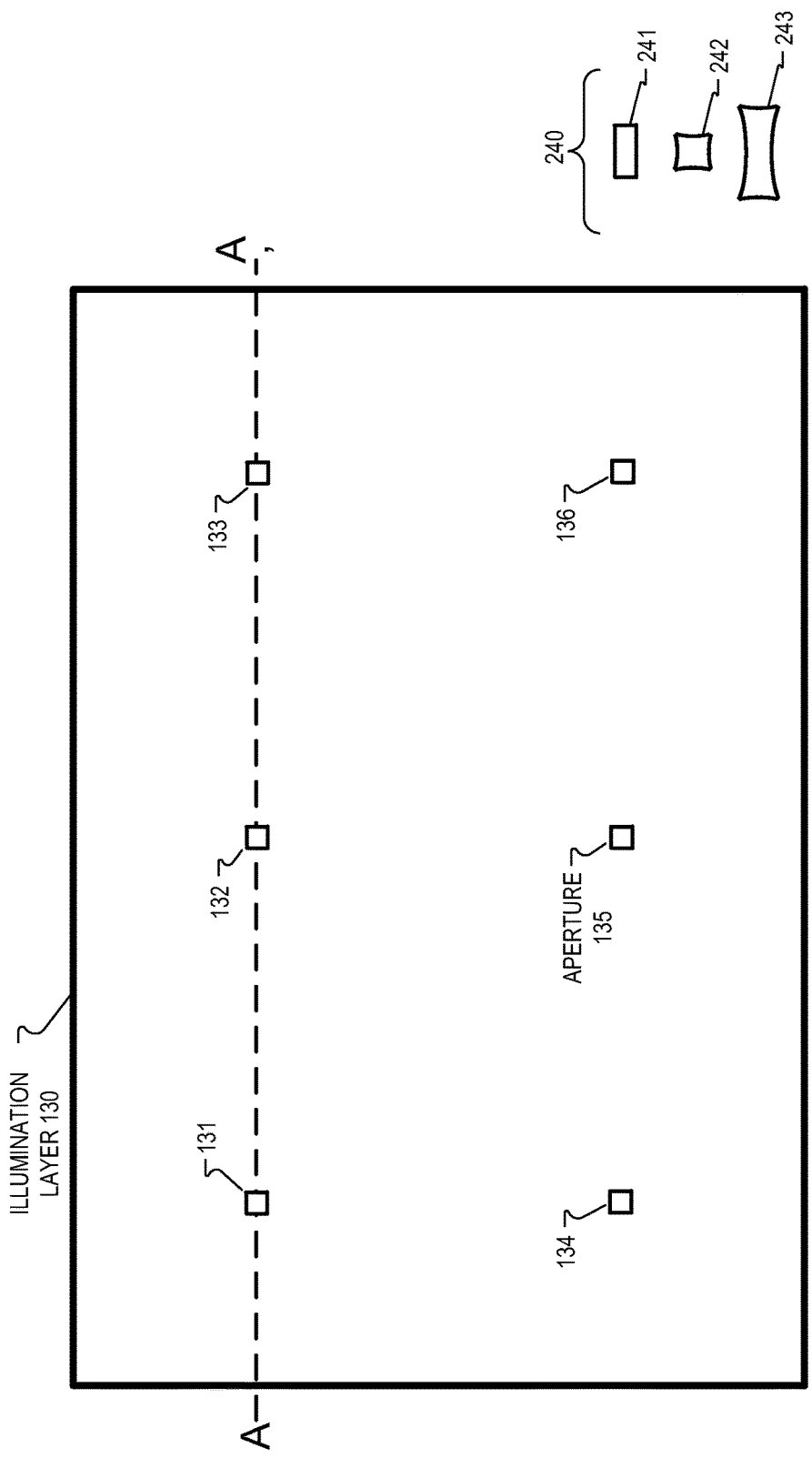
FIG. 2 shows a plan view of an example illumination layer for a display apparatus, in accordance with an embodiment of the disclosure.

FIG. 2 shows a plan view of an example illumination layer 130 for display apparatus 101, in accordance with an embodiment of the disclosure. In FIG. 2, each emission aperture 131-136 is square. In one embodiment, the emission apertures are 1 mm×1 mm squares. In one embodiment, the emission apertures are 0.25 mm×0.25 mm squares. However, the shape of the emission aperture may be different depending on additional optical factors. FIG. 2 also shows alternative emission aperture shapes 241, 242, and 243. Shape 241 is a rectangle (e.g. 16:9 aspect ratio), shape 242 is a distorted square, and shape 243 is a distorted rectangle. The shape of the pixlets in display layer 120 may be square, rectangle, distorted square, or distorted rectangle to accommodate the emission aperture shape in order to account for optical aberrations such as distortion (pincushion or barrel), effectively applying a correction factor at the emission aperture to attain a square or rectangular magnified sub-image 192 on screen layer 110.

FIG. 3A shows a cross-section view (through line A-A' of FIG. 2) of an example illumination layer 330, in accordance with an embodiment of the disclosure. Illumination layer 330 includes at least one light source 305 emitting lamp light 350 into a diffusing region 325 of the illumination layer. In FIG. 3A, light sources 305A-E are each illustrated as light emitting diodes ("LEDs"), although other light sources (e.g. laser diodes) may be used. Light sources 305A-E are example locations of light sources and it is understood that each position may not necessarily be utilized. In one embodiment, only one LED is used as a light source to inject lamp light 350 into diffusing region 325. Illumination layer 330 also includes a plurality of emission apertures 131-136 that are each configured to emit lamp light 350 from the diffusing region 325 in a divergent projection beam 147 having limited angular spread (e.g. 20-70 degrees). In an embodiment, divergent projection beam 147 may be substantially shaped as a cone (circular aperture) or an inverted pyramid (rectangle/square aperture). In one embodiment, the emission aperture is shaped as a pin-cushion to compensate for anticipated distortion due to magnification.

FIG. 3A further illustrates baffles 315 that can be used to prevent lamp light 350 from the light source 305 from directly illuminating an emission aperture. This may increase the uniformity of the intensity of lamp light across a cross section of divergent projection beam 147. Diffusing region 325 may include specular surfaces 391, diffuse surfaces 392, or a combination. In some embodiments, the portion of diffusing region 325 under each emission aperture may be a diffuse surface to promote a diffuse propagation of lamp light 350 as it travels toward an emission aperture to become divergent projection beam 147. Diffusing region 325 may also include example structured extraction features such as feature 393, 394, and/or 395 to direct lamp light 350 toward the emission apertures.

In one embodiment, diffusing region 325 is configured as a diffusing cavity to generate diffuse lamp light. In this embodiment, a diffuse reflective material coats at least a portion of the inside of the diffusing cavity (except for the emission apertures) to scatter the lamp light 350 from the light source 305. The diffuse reflective material may be similar to the coating found in conventional integrating spheres. In one embodiment, a white colored diffuse material from W.L. Gore & Associates lines the inside of the diffusive cavity.

In one embodiment, diffusing region 325 is configured as a transparent lightguide optically coupled to accept lamp light 350 from the light source(s) and configured to retain lamp light 350 within the transparent lightguide (except for where lamp light 350 escapes through the emission apertures as the divergent projection beams 147). The transparent lightguide may retain lamp light 350 by generally maintaining Total-Internal-Reflection ("TIR"). The transparent lightguide may also retain lamp light 350 by having a reflective material abutting the transparent lightguide. In both examples, the multiple reflections of lamp light 350 within the transparent lightguide generate randomized scattered (diffuse) lamp light for emission by the emission apertures.

Whether a diffusing cavity or a transparent lightguide is utilized, the lamp light within diffusing region 325 becomes diffuse lamp light that is suitable for emission by the emission apertures. Other techniques may be used to generate diffuse lamp light within diffusing region 325. Diffusing region 325 may be configured so that each emission aperture receives approximately the same amount of diffuse lamp light. The diffuse lamp light within diffusing region 325 helps the emission apertures ultimately emit their divergent projection beams 147 having limited angular spread with substantially uniform intensity across the angular spread.

One or more techniques may be used to configure the emission apertures to emit the desired divergent projection beam 147 having limited angular spread with substantially uniform intensity across the angular spread. FIGS. 3B-3I illustrate example designs for emission apertures of illumination layer 330, in accordance with an embodiment of the disclosure.

Figure 3D:
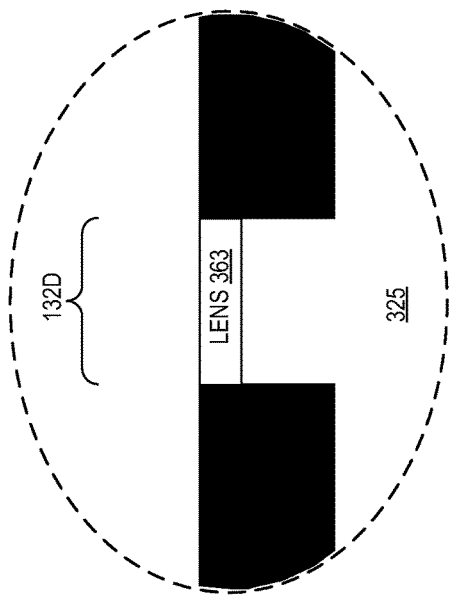

FIG. 3B shows an example emission aperture 132A. Emission aperture 132A is the same width as emission aperture 132B in FIG. 3C. However, because the layer 323A that defines the depth of emission aperture 132A is thinner than layer 323B that defines the depth of emission aperture 132B, the angular spread 342A is greater than the angular spread 342B in FIG. 3C. Hence, designers can use the width and depth of each emission aperture to control the width of the limited angular spread of each divergent projection beam 147. FIG. 3D shows that tapering aperture 132C into a tapered through-hole in layer 323C can also be one way of controlling the angular spread 342C of a given emission aperture.

Figure 3E:
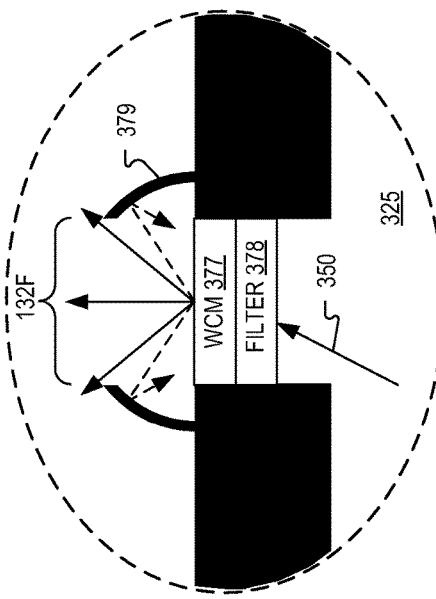

FIG. 3E shows that emission aperture 132D includes a lens 363. Lens 363 is illustrated within emission aperture 132D, but lens 363 may also be disposed above and/or overlapping emission aperture 132D. Lens 363 may have more than one optical element. Lens 363 may be configured to focus diffuse lamp light within diffusing region 325 into a divergent projection beam 147. Lens 363 may help define (or fully define) the limited angular spread and/or assist in homogenizing the intensity of lamp light within divergent projection beam 147 so that the intensity of divergent projection beam 147 incident upon each pixel in a given pixelet is substantially similar. Lens 363 may include diffractive and/or refractive elements. In one embodiment, lens 363 is a Fresnel lens to reduce the z-axis dimension of lens 363. If lens 363 is a diffractive lens, it may be configured/tuned to act on specific wavelength ranges (e.g. 525-535 nm). Lens 363 may include multiple diffractive elements that are tuned to act on multiple wavelengths. In one embodiment, the light sources that generate lamp light are red, green, and blue and lens 363 is tuned to act on or focus wavelengths that correspond with the red, green, and blue wavelengths emitted by the red, green, and blue light sources.

In one case, lens 363 focuses the lamp light propagating out of emission aperture 132D into a point in space between the illumination layer 330 and display layer 120 before the lamp light continues as the divergent projection beam 147 to illuminate its corresponding pixelet in display layer 120. In this case, the focal length of lens 363 is less than half of dimension 165. In a different case (not illustrated), a lens (whether refractive, Fresnel, or diffractive) may be positioned less than one focal length forward of the emission aperture 132 (between illumination layer 130 and display layer 120), creating a divergent virtual source behind the emission aperture. This has the effect of reducing the total depth (thickness) of the illumination layer.

Figure 3F:
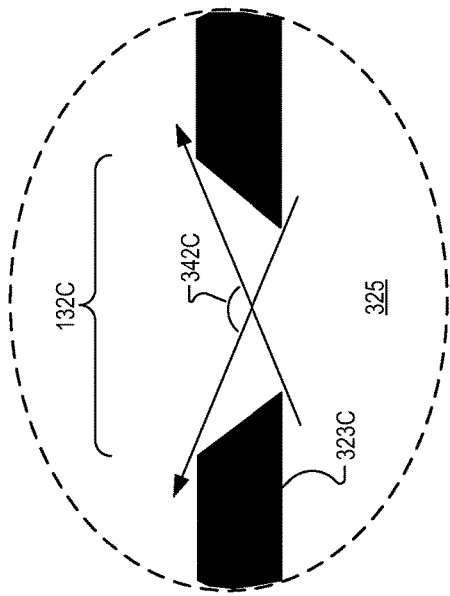

FIG. 3F shows that example emission aperture 132E includes a phosphor layer 377 disposed above lens 373. Of course, phosphor layer 377 and lens 373 may be disposed above (rather than within) emission aperture 132E. In one example, light source(s) 305 emit blue light and lens 373 is a diffractive lens configured/tuned to focus the blue light into divergent projection beam 147. As the blue light (in divergent projection beam 147) propagates toward display layer 120, it encounters phosphor layer 377. The blue light excites/stimulates phosphor layer 377 to convert the blue light into white light so that divergent projection beam 147 is white light after propagating through phosphor layer 377. Diffractive lens 373 may be tuned to focus a wavelength range (e.g. 445-455 nm) of a light source (e.g. a 450 nm blue LED) that emits light centered within that wavelength range. In different embodiments, other wavelength converting materials (e.g. quantum dots) may be substituted for phosphor layer 377. When wavelength converting materials (e.g.

phosphor or quantum dots) are used, light source(s) 305 may be referred to as a pump source and have a wavelength between 365 and 450 nm.

Figure 3G:
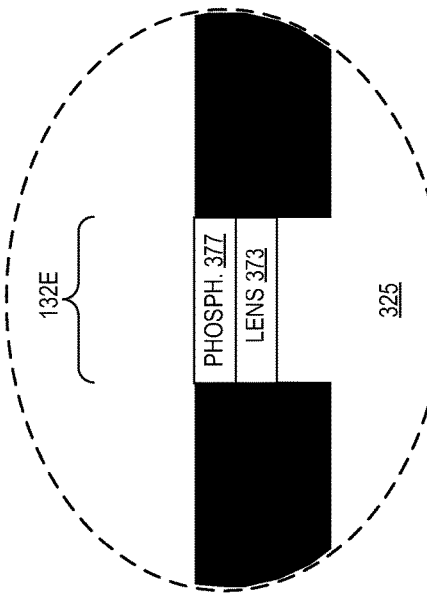

In FIG. 3G, a filter 378 is placed below the wavelength converting material 377. Filter 378 passes the wavelength of a pump source (e.g. 370 nm), but reflects wavelengths (e.g. greater than 400 nm) that are greater than the pump source. Hence, filter 378 effectively recycles light emitted by the wavelength converting material 377 by reflecting/directing the emitted light back out emission aperture 132F rather than allowing the emitted light to propagate back into diffusing region 325 and be wasted. Optionally, a reflective shell optic 379 can be placed over wavelength converting material 377 to further define divergent projection beam 147. Reflective shell optic 379 includes a reflective material on its inside to reflect/recycle light (illustrated as dashed lines) that doesn't exit shell optic 379.

FIGS. 3H and 3I illustrate example emission aperture 132G and 132H that can be used in embodiments that include a transparent lightguide utilizing TIR in diffusing region 325. In FIG. 3H, lamp light ray 351 strikes the boundary of the transparent lightguide and reflects back into the transparent lightguide as the angle of incidence did not overcome the critical angle. However, lamp light ray 352 strikes a spherical inward feature 358 that allows lamp light ray 352 to exit the transparent lightguide. This spherical inward feature 358 functions as aperture 132G as the spherical shape of the feature encourages the lamp light to escape the transparent lightguide. Shapes other than spherical imprints can be used to disrupt the TIR of the transparent lightguide in order to facilitate emission of the lamp light within diffusing region 325. FIG. 3I includes a spherical outward feature 359 that functions similarly to spherical inward feature 358 in that lamp light ray 351 is internally reflected, while lamp light ray 353 encounters a curved boundary (feature 359) of the transparent lightguide that allows ray 353 to escape/emit. Spherical features 358 and 359 can be formed in injection molding processes of the lightguide or can be formed in subtractive processes (e.g. milling). It is appreciated that additional optics (e.g. diffractive and/or refractive) may be disposed over features 358 or 359 and be included in emission apertures 132G and 132H, respectively.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A tileable display panel comprising:
a screen layer for displaying a unified image to a viewer;
an illumination layer including a light source emitting lamp light into a diffusing region of the illumination layer, wherein the illumination layer also includes a plurality of emission apertures that are each configured to emit the lamp light from the diffusing region in a divergent projection beam having limited angular spread; and
a display layer disposed between the screen layer and the illumination layer, the display layer being offset from the illumination layer by a first fixed distance and being offset from the screen layer by a second fixed distance, the display layer including a plurality of pixelets, wherein each pixelet of the plurality of pixelets corresponds to a respective one of the plurality of emission apertures, each pixelet including an array of pixels, wherein each pixel in the plurality of pixels is positioned to be illuminated by the divergent projection beam from a respective emission aperture of the plurality of emission apertures, and wherein each pixelet in the plurality of pixelets is separated from any adjacent pixelet by a spacing region, wherein each emission aperture in the plurality of emission apertures includes a diffractive optic configured to focus the lamp light into the divergent projection beam,
wherein each emission aperture in the plurality of emission apertures further includes a phosphor disposed between the diffractive optic and the display layer, and wherein the diffractive optic is tuned to focus a first wavelength range that excites the phosphor to emit white light, the light source configured to emit the lamp light centered within the first wavelength range.

2. The tileable display panel of claim 1, wherein each emission aperture of the plurality of emission apertures includes additional optics configured to generate increased uniformity of the lamp light within the divergent projection beams.

3. The tileable display panel of claim 1, wherein the diffusing region includes a transparent lightguide coupled to accept the lamp light from the light source and configured to generally retain the lamp light within the transparent lightguide except for where the emission apertures emit the lamp light as the divergent projection beams.

4. The tileable display panel of claim 3, wherein the transparent lightguide is configured to generally retain the lamp light by maintaining total-internal-reflection ("TIR"), and wherein the emission apertures are configured to disrupt the TIR to emit the lamp light from the transparent lightguide as the divergent projection beams.

5. The tileable display panel of claim 3, wherein the diffusing region includes reflective material abutting the transparent lightguide to retain the lamp light within the transparent lightguide.

6. The tileable display panel of claim 1, wherein the diffusing region includes a diffusing cavity coated with a reflective scattering material for scattering the lamp light from the light source.

7. The tileable display panel of claim 1, wherein each emission aperture in the plurality of emission apertures includes a Fresnel lens configured to focus the lamp light into the divergent projection beam.

8. The tileable display panel of claim 1, wherein the light source includes at least one of a laser diode or a light emitting diode ("LED").

9. The tileable display panel of claim 1, wherein the emission apertures are tapered through-holes.

10. The tileable display panel of claim 1, wherein each emission aperture in the plurality in the plurality of emission apertures is centered under its corresponding pixelet.

11. A multi-panel display comprising:
a plurality of display panels arranged as the multi-panel display to display a multi-panel unified image across the display panels, wherein each of the display panels includes:
   a screen layer for displaying a unified image to a viewer;
   an illumination layer including a light source emitting lamp light into a diffusing region of the illumination layer, wherein the illumination layer also includes a plurality of emission apertures that are each configured to emit the lamp light from the diffusing region in a divergent projection beam having limited angular spread; and
   a display layer disposed between the screen layer and the illumination layer, the display layer being offset from the illumination layer by a first fixed distance and being offset from the screen layer by a second fixed distance, the display layer including a plurality of pixelets, wherein each pixelet of the plurality of pixelets corresponds to a respective one of the plurality of emission apertures, each pixelet including an array of pixels, wherein each pixelet in the plurality of pixelets is positioned to be illuminated by only the divergent projection beam from a respective emission aperture of the plurality of emission apertures, and wherein each pixelet in the plurality of pixelets is separated from any adjacent pixelet by a spacing region.

12. The multi-panel display of claim 11, wherein each of the emission apertures in the plurality of emission apertures includes a diffractive optic configured to focus the lamp light into the divergent projection beam.

13. The multi-panel display of claim 12, where each emission aperture in the plurality of emission apertures further includes a phosphor disposed between the diffractive optic and the display layer, and wherein the diffractive optic is tuned to focus a first wavelength range that excites the phosphor to emit white light, the light source configured to emit the lamp light centered within the first wavelength range.

14. The multi-panel display of claim 11, wherein each emission aperture of the plurality of emission apertures includes additional optics configured to generate increased uniformity of the lamp light within the divergent projection beams.

15. The multi-panel display of claim 11, wherein the diffusing region includes a transparent lightguide coupled to accept the lamp light from the light source and configured to generally retain the lamp light within the transparent lightguide except for where the emission apertures emit the lamp light as the divergent projection beams.

16. The multi-panel display of claim 15, wherein the transparent lightguide is configured to generally retain the lamp light by maintaining total-internal-reflection ("TIR"), and wherein the emission apertures are configured to disrupt the TIR to emit the lamp light from the transparent lightguide as the divergent projection beams.

17. The multi-panel display of claim 11, wherein the diffusing region includes a diffusing cavity coated with a reflective scattering material for scattering the lamp light from the light source.

18. A display comprising:
   a screen layer for displaying a unified image to a viewer;
   an illumination layer including a light source emitting lamp light into a diffusing region of the illumination layer, wherein the illumination layer also includes a plurality of emission apertures that are each configured to emit the lamp light from the diffusing region in a divergent projection beam having limited angular spread; and
   a display layer disposed between the screen layer and the illumination layer, the display layer being offset from the illumination layer by a first fixed distance and being offset from the screen layer by a second fixed distance, the display layer including a plurality of pixelets, wherein each pixelet of the plurality of pixelets corresponds to a respective one of the plurality of emission apertures, each pixelet including an array of pixels, wherein each pixelet in the plurality of pixelets is positioned to be illuminated by only the divergent projection beam from a respective emission aperture of the plurality of emission apertures, and wherein each pixelet in the plurality of pixelets is separated from any adjacent pixelet by a spacing region.

19. The display of claim 18, wherein each emission aperture in the plurality of emission apertures includes a diffractive optic configured to focus the lamp light into the divergent projection beam.

20. The display of claim 19, wherein each emission aperture in the plurality of emission apertures further includes a phosphor disposed between the diffractive optic and the display layer, and wherein the diffractive optic is tuned to focus a first wavelength range that excites the phosphor to emit white light.

* * * * *